(12) United States Patent
Jeon et al.

(10) Patent No.: US 7,266,164 B2
(45) Date of Patent: Sep. 4, 2007

(54) APPARATUS FOR SYMBOL TIMING DETECTION FOR WIRELESS COMMUNICATION SYSTEM

(75) Inventors: Taehyun Jeon, Sungnam-shi (KR); Sok-Kyu Lee, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 678 days.

(21) Appl. No.: 10/855,698

(22) Filed: May 26, 2004

(65) Prior Publication Data

US 2005/0117674 A1 Jun. 2, 2005

(30) Foreign Application Priority Data

Nov. 28, 2003 (KR) ............ 10-2003-0085489

(51) Int. Cl.
*H03D 1/00* (2006.01)
(52) U.S. Cl. .................... 375/340; 375/342
(58) Field of Classification Search ............ 375/340, 375/357, 362, 342, 368
See application file for complete search history.

(56) References Cited

U.S. PATENT DOCUMENTS

| | | | |
|---|---|---|---|
| 6,563,856 B1 | 5/2003 | O'Shea et al. | |
| 2004/0141570 A1* | 7/2004 | Yamazaki et al. | .......... 375/340 |

OTHER PUBLICATIONS

"Frame synchronization of OFDM systems in frequency selective fading channels", M. Speth, et al., pp. 1807-1811.

* cited by examiner

*Primary Examiner*—Khai Tran
(74) *Attorney, Agent, or Firm*—Blakely Sokoloff Taylor & Zafman

(57) ABSTRACT

The present invention is directed to an apparatus for symbol timing detection for a wireless communication system. According to the present invention, the samples of the output of an analog-to-digital converter are utilized prior to the completion of the automatic gain control function to detect symbol timing using autocorrelations of the samples, and a structure supporting an average window size and a delay value is provided to optimize the complexity and allow a signal demodulation of high reliability.

9 Claims, 8 Drawing Sheets

US 7,266,164 B2

APPARATUS FOR SYMBOL TIMING DETECTION FOR WIRELESS COMMUNICATION SYSTEM

CROSS REFERENCE TO RELATED APPLICATION

This application claims priority to and the benefit of Korea Patent Application No. 2003-85489 filed on Nov. 28, 2003 in the Korean Intellectual Property Office, the content of which is incorporated herein by reference.

BACKGROUND OF THE INVENTION (a) Field of the Invention

The present invention relates to an apparatus for symbol timing detection for a wireless communication system. More specifically, the present invention relates to an apparatus for symbol timing detection for a wireless communication system that is for detecting a start of actual user data that is communicated.

(b) Description of the Related Art

For data transmission in frame units in a wireless communication system, a transmitter transmits signals of a predefined type to a receiver. A signal of this type is called a preamble or training signal, of which an interval supports several functions concerning the determination of the presence of an effective received signal, automatic gain control, initial carrier frequency error estimation and compensation, symbol timing detection for determining the start of actual user data, etc.

At the receiver of the wireless communication system, a symbol timing detector performs a function of detecting the start of the actual user data. The symbol timing detection methods concerned include an autocorrelation method and a crosscorrelation method.

U.S. Pat. No. 6,563,856 (May 13, 2003; Frame Synchronization and Detection Technique for Digital Receiver) proposes a technique for acquiring synchronization of digital receiver frames using a characteristic signal called a frame marker, and it uses the cross-correlation method. The cross-correlation method involves a large number of calculations every clock period, and causes a deterioration of performance in the case of occurrence of a carrier frequency error.

Contrarily, the autocorrelation method involves a lesser number of calculations and is simply realized.

FIG. 1 is a schematic of a frame having a preamble of a cyclic signal type for wireless data communication in frame units.

Referring to FIG. 1, the preamble of the frame is cyclically repeated with a cycle T. FIG. 1 shows a preamble of which the cycle T repeats ten times, with a waveform including 16 samples per cycle.

The general packet-based wireless data communication system uses signals of the same type as the preamble to perform schematic estimation and compensation of carrier frequency errors and symbol timing detection for detecting the accurate start of the frame.

FIG. 2 is a block diagram of a conventional apparatus for symbol timing detection using the autocorrelation method.

The conventional apparatus for symbol timing detection using the autocorrelation method comprises, as shown in FIG. 2, a delay section 201, a complex conjugate processor 202, a multiplier 203, a moving average calculator 204, a squarer 205, a moving average calculator 206, a normalizer 207, and an absolute value processor 208.

The delay section 201 delays a received signal by the correlation delay sample value $\Delta_{ac}$ of the received signal, and the complex conjugate processor 202 multiplies the complex conjugate $r_k^*$ of the delayed signal by the received signal.

The multiplier 203 multiplies the signal of the complex conjugate processor 202 by the original received signal to output a value $q_k$, and the moving average calculator 204 stores the output signal $q_k$ of the multiplier 203 in a shift register having a window size of $W_{ac}$ and calculates an average of the stored values to output a value $x_k$.

The squarer 205 makes the second power of the magnitude of the received signal, i.e., $s_k = |r_k|^2$, and the moving average calculator 206 calculates the moving average $y_k$ of the squared magnitude of the received signal.

The normalizer 207 divides $x_k$ by $y_k$ to detect a normalized correlation value, and the absolute value processor 208 searches for the maximum value based on the calculated value $\rho_k$ to estimate the symbol timing according to the result $\rho_k$.

The detection of timing synchronization using the cyclically repeating preamble structure and the autocorrelation method is dependent upon the selected values $\Delta_{ac}$ and $W_{ac}$ in regard to its performance and complexity of implementation. In addition, the leading part of the preamble of FIG. 1 has an interval that determines an adequate level of the received signal by an automatic gain control. There is thus a problem that the signals after the analog-to-digital converter may be inaccurate in that interval due to saturation of the signal level during the operation of the analog-to-digital converter.

The use of the value $W_{ac}$ that is for averaging a large amount of data is desirable, since the size of the moving average window has an influence on the reliability of the correlation signals. However, there is a need for considering the relationship between the performance according to $W_{ac}$ and the complexity of implementation.

SUMMARY OF THE INVENTION

It is an advantage of the present invention to provide a symbol timing technique and structure that is efficient in the aspect of performance and complexity of implementation, for a wireless communication system for frame-based data transmission.

In one aspect of the present invention, there is provided an apparatus for symbol timing detection for a wireless communication system, which is for detecting a start of user data of a packet having a cyclically repeating preamble in the wireless communication system, the apparatus including: a mapper for mapping a received packet signal with a predetermined number of bits; an autocorrelation delay processor for delaying the mapped signal of the mapper by a correlation delay sample according to an autocorrelation of the received signal, and converting the delayed signal to a complex conjugate signal; a multiplier for multiplying the signal, delayed by the correlation delay sample and converted to a complex conjugate signal from the autocorrelation delay processor, by the mapped signal of the mapper; a first moving average calculator for storing an output signal of the multiplier in a shift register having a predetermined window size, and calculating an average of a shifted value according to signal reception to output a moving average; a squarer for making the second power of the mapped signal of the mapper; a second moving average calculator for storing an output signal of the squarer in a shift register having a window size equal to the moving average, and calculating an average of a shifted value according to signal reception to output a second moving average; and a symbol timing detector for extracting the start of the user data using an absolute value of an output signal of the first moving average calculator and an output signal of the second moving average calculator.

In another aspect of the present invention, there is provided an apparatus for symbol timing detection for a wireless communication system, which is for detecting a start of user data of a packet having a cyclic repeating preamble in the wireless communication system, the apparatus including: an autocorrelation delay processor for delaying a received packet signal by a correlation delay sample according to autocorrelation, mapping the delayed signal with a predetermined number of bits, and converting the mapped signal to a complex conjugate signal; a first multiplier for multiplying an output signal of the autocorrelation delay processor by the received signal; a second multiplier for multiplying a signal obtained by quantizing the delayed and mapped signal of the autocorrelation delay processor by the received signal; a first moving average calculator for storing an output signal of the first multiplier in a shift register having a predetermined window size, and calculating an average of the shifted value according to signal reception; a squarer for making the second power of an output signal of the second multiplier; a second moving average calculator for storing an output signal of the squarer in a shift register having a window size equal to the moving average, and calculating an average of the shifted value according to signal reception; and a symbol timing detector for detecting the start of the user data using an absolute value of an output signal of the first moving average calculator and an output signal of the second moving average calculator.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

The present invention is directed to accurately detecting the start of payload data of actual users by using the autocorrelation characteristic of cyclically repeating preamble signals generally used in the wireless communication system for frame- or packet-based data communication.

Figure 1:
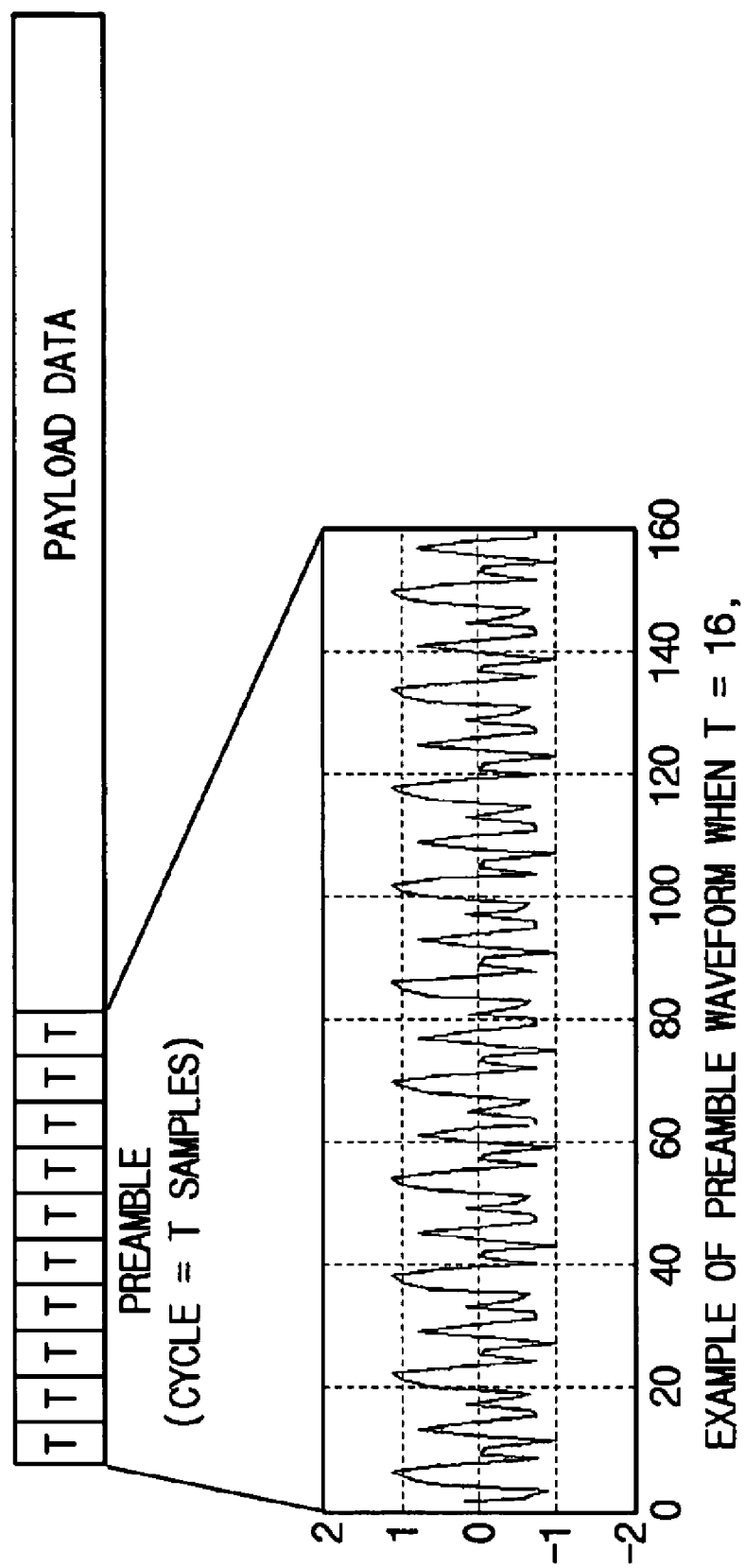
FIG. 1 is a schematic of a frame having a preamble of a cyclic signal type for frame-based wireless data communication.
Figure 2:
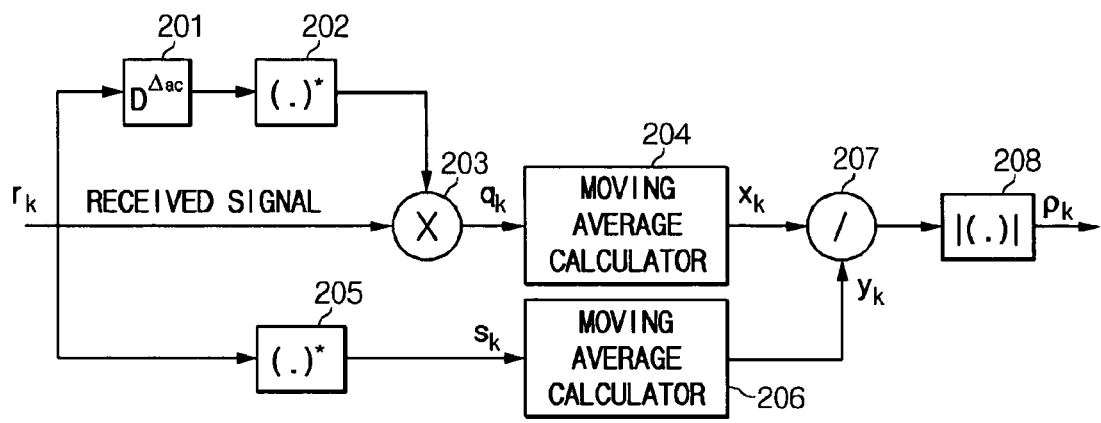
FIG. 2 is a block diagram of a conventional symbol timing detection apparatus using the autocorrelation method.
Figure 3:
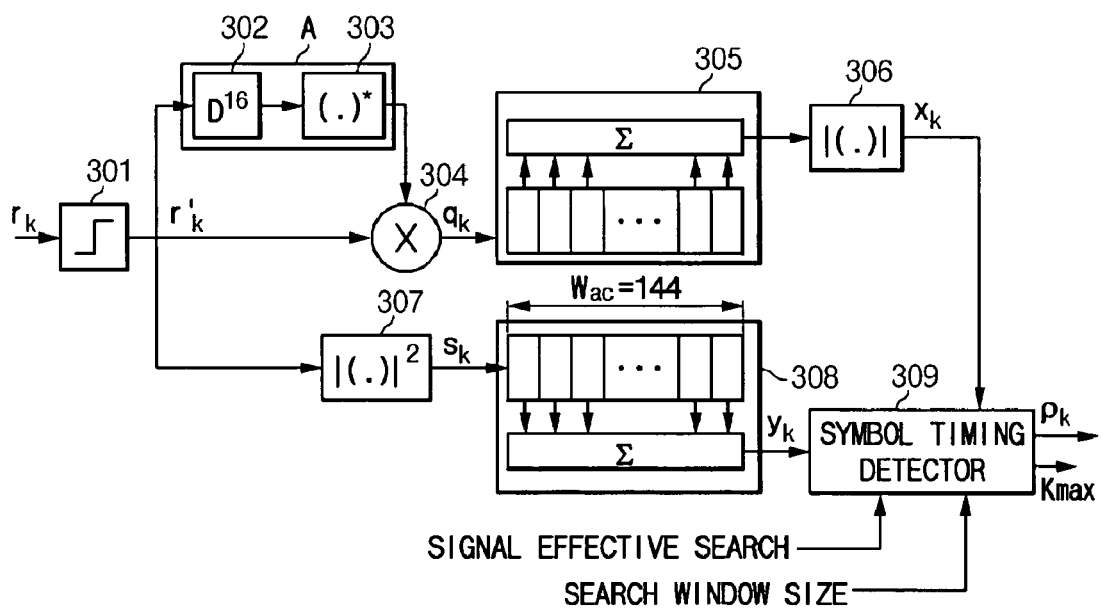
FIG. 3 is a block diagram of an apparatus for symbol timing detection for a wireless communication system according to a first embodiment of the present invention.

FIG. 3 is a block diagram of an apparatus for symbol timing detection according to a first embodiment of the present invention.

The apparatus for symbol timing detection according to the first embodiment of the present invention comprises, as shown in FIG. 3, a mapper 301, an autocorrelation delay section 302, a complex conjugate processor 303, a multiplier 304, moving average calculators 305 and 308, an absolute value calculator 306, a squarer 307, and a symbol timing detector 309.

The mapper 301 maps the sample $r_k$ of a given preamble into a 1-bit sample $r_k'$. The reason why the sample of the preamble is mapped is that the output of the analog-to-digital converter using a sample of the interval involved in automatic gain control cannot be used as it is. The use of the sample of the preamble mapped into a 1-bit sample minimizes the effect of automatic gain control and has a benefit in the aspect of realization when a performance deterioration is not so significant relative to the case of using the sample without mapping into a 1-bit sample.

The autocorrelation delay section 302 and the complex conjugate processor 303 belong to an autocorrelation delay processor A, that delays the one-bit mapped signal of the mapper 301 into a complex conjugate (called a conjugate complex number).

The multiplier 304 multiplies the signal of the autocorrelation delay processor A by the one-bit mapped signal $r_k'$ to output a value $q_k$. The moving average calculator 305 averages the signal $q_k$ of the multiplier 304 stored in a shift register having a window size of $W_{ac}$, and outputs a value $x_k$ through the absolute value calculator 306.

The value $x_k$ is given by the following equation.

$$x_k = \left| \frac{1}{W_{ac}} \sum_{i=0}^{W_{ac}-1} q_{k-i} \right| = \left| \frac{1}{W_{ac}} \sum_{i=0}^{W_{ac}-1} r_{k-i}' r_{k\Delta_{ac}-i}'^* \right| \quad \text{Equation 1}$$

where $r_k'$ is a one-bit mapped signal from the received signal, and $r_{k-\Delta_{ac}}'$ is a complex conjugate (called a conjugate complex number) of the mapped signal delayed by $\Delta_{ac}$.

The squarer 307 makes the second power of the one-bit mapped signal $r_k'$, and the moving average calculator 308 calculates the moving average $y_k$ of the magnitude of the squared signal.

The value $y_k$ is given by the following equation.

$$y_k = \frac{1}{W_{ac}} \sum_{i=0}^{W_{ac}-1} s_{k-i} = \frac{1}{W_{ac}} \sum_{i=0}^{W_{ac}-1} r_{k-i}' r_{k-i}'^* \quad \text{Equation 2}$$

In the first embodiment of the present invention, the given preamble consists of 160 samples for 10 periods. Here, the values of $W_{ac}$ and $\Delta_{ac}$ are 144 and 16, respectively so as to detect the maximum of the correlation and recognize the sample time corresponding to the maximum correlation as the end of the preamble.

The moving average calculators 305 and 308 calculate the average with the moving window size of $W_{ac}$, so the Equations 1 and 2 can be rewritten as:

$$x_k = \left| \frac{1}{144} \sum_{i=0}^{144-1} q_{k-i} \right| = \left| \frac{1}{144} \sum_{i=0}^{143} r_{k-i}' r_{k-16-i}'^* \right| \quad \text{Equation 3}$$

$$y_k = \frac{1}{144} \sum_{i=0}^{144-1} s_{k-i} = \frac{1}{144} \sum_{i=0}^{143} r_{k-i}' r_{k-i}'^*$$

The symbol timing detector 309 determines the position of the maximum using the outputs $x_k$ and $y_k$ of the absolute value calculator 306 and the moving average calculator 308, respectively, and detects the start of the user data based on the position of the maximum.

The output $\rho_k$ of the symbol timing detector 309 is given by:

$$\rho_k = \left| \frac{x_k}{y_k} \right| = \frac{\left| \sum_{i=0}^{143} r_{k-i}' r_{k-16-i}'^* \right|}{\sum_{i=0}^{143} r_{k-i}' r_{k-i}'^*} \quad \text{Equation 4}$$

The output signal $\rho_k$ for symbol timing detection in the above-described structure is represented by way of experiments as follows.

Figure 4:
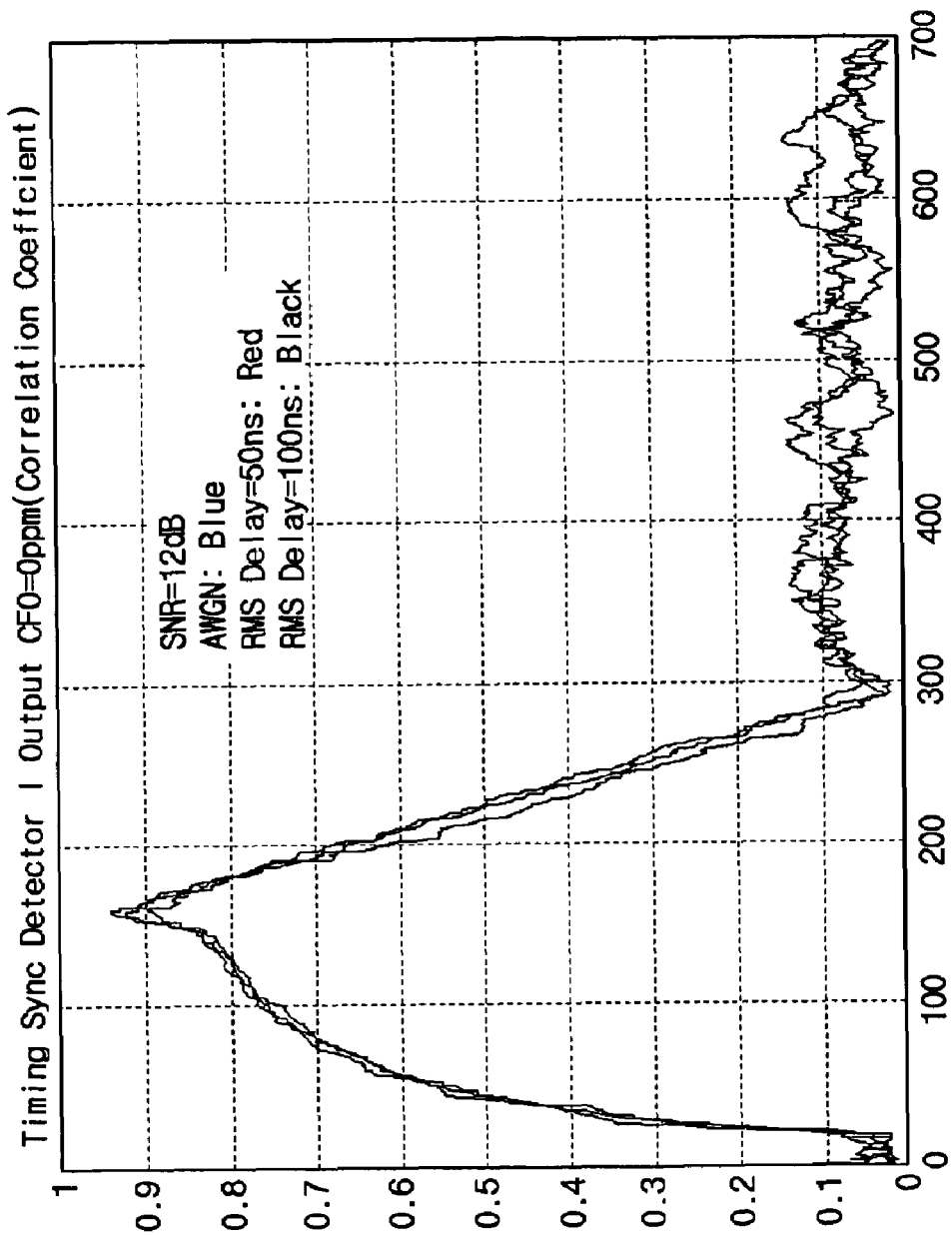
FIG. 4 shows the output of a symbol timing detector in a white noise and delay spread channel environment in the apparatus of FIG. 3.

FIG. 4 shows the output of the symbol timing detector in a white noise and delay spread channel environment in the apparatus of FIG. 3.

Referring to FIG. 4, the time-based change of the output $\rho_k$ of the symbol timing detector is given at a signal-to-noise ratio (SNR) of 12 dB. The zero '0' point on the time axis represents the start of the actual preamble.

The lines in FIG. 4 denote a white noise channel, a root mean square (RMS) delay spread value of 50 ns, and a RMS delay spread value of 100 ns, respectively.

Figure 5:
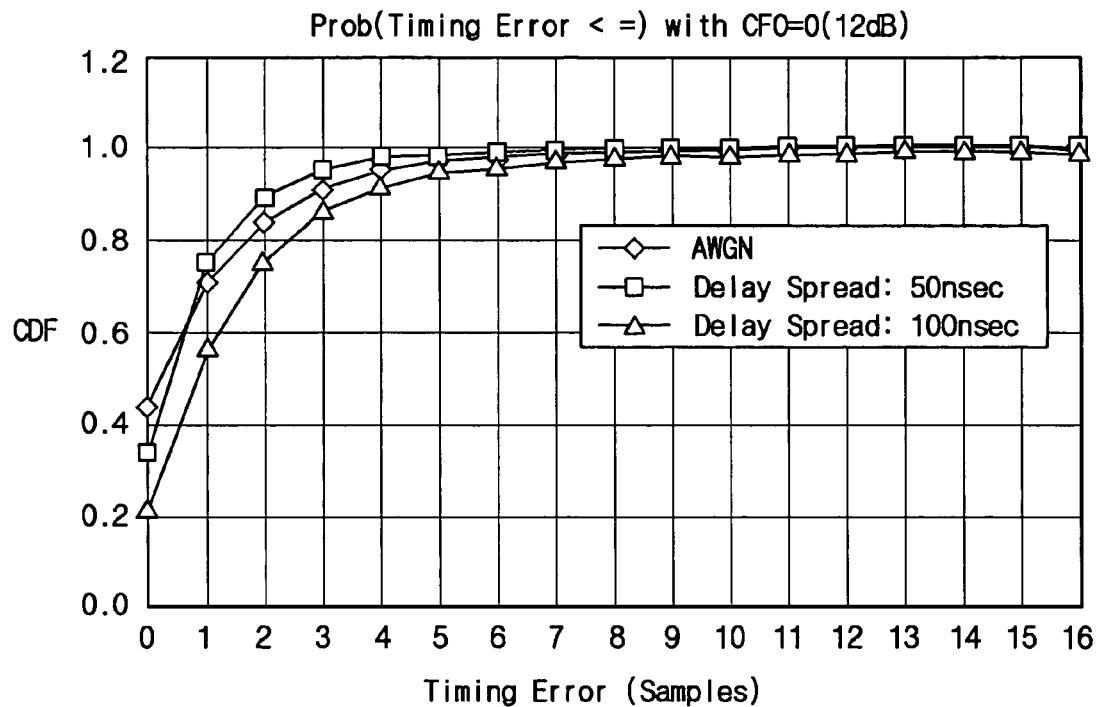
FIG. 5 shows the probability of causing an error in a white noise and delay spread channel environment in the apparatus of FIG. 3.

Referring to FIG. 5, for the analysis of accuracy of timing detection, it is shown how far the end of the preamble detected by the apparatus of FIG. 3 is apart from the end of the actual data.

The detection apparatus is considered to be much better in performance as the graph being of a cumulative distribution function (CDF) type converges on 1.0 more quickly.

It is revealed in FIG. 5 that the probability of the symbol timing error being less than 4 samples exceeds 90% in all cases in the same environment of FIG. 4.

In the construction of the timing detection apparatus using the autocorrelation method, any other appropriate type of symbol timing detection apparatus can be used in place of the apparatus for symbol timing detection according to the first embodiment of the present invention.

Figure 6:
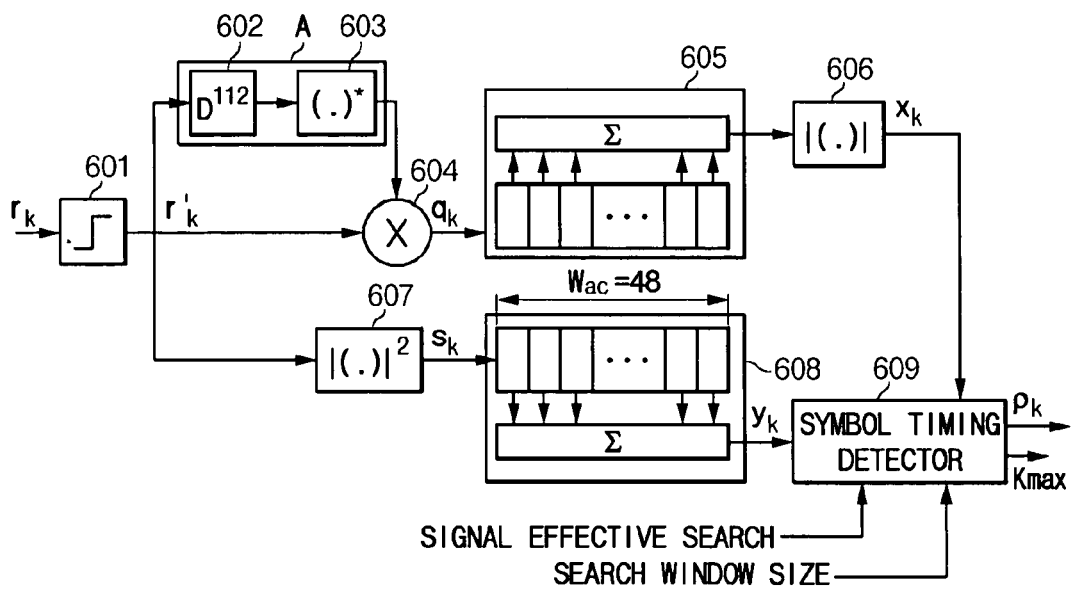
FIG. 6 is a block diagram of an apparatus for symbol timing detection for a wireless communication system according to a second embodiment of the present invention.

FIG. 6 is a block diagram of an apparatus for symbol timing detection for a wireless communication system according to a second embodiment of the present invention.

Referring to FIG. 6, the apparatus for symbol timing detection having the same structure of FIG. 3 is constructed in the second embodiment, according to which the moving average window size $W_{ac}$ is reduced to 48 so as to decrease required complexity per symbol period.

To unify the maximum of the theoretical autocorrelation, $\Delta_{ac}$ must be 112 in consideration of the structure of a given preamble.

In the apparatus for symbol timing detection of the same structure of FIG. 3, the experimental values according to the second embodiment, in which the values $W_{ac}$ (=48) and $\Delta_{ac}$ (=112) are varied, are given as follows.

Figure 7:
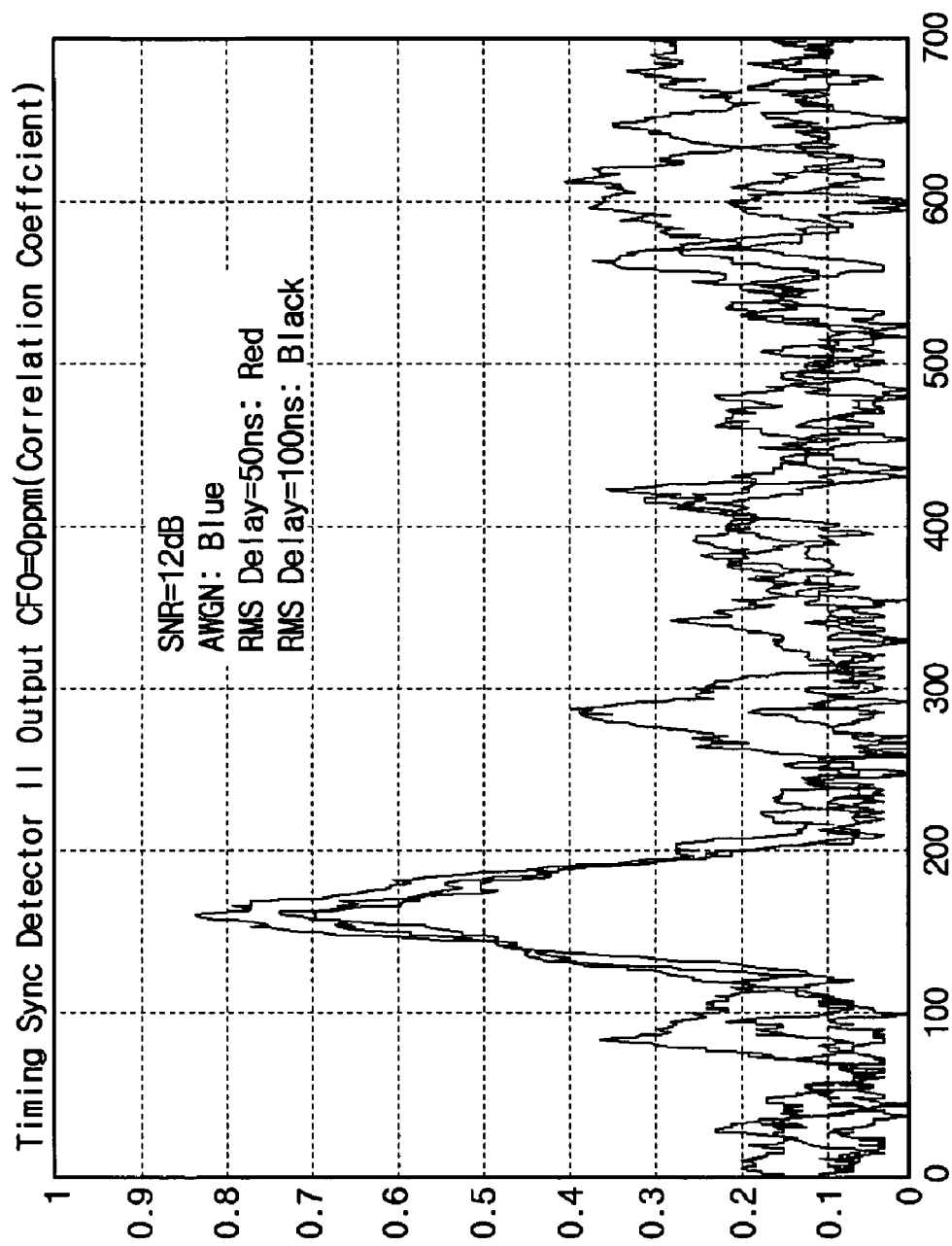
FIG. 7 shows the output of a symbol timing detector in a white noise and delay spread channel environment in the apparatus of FIG. 6.
Figure 8:
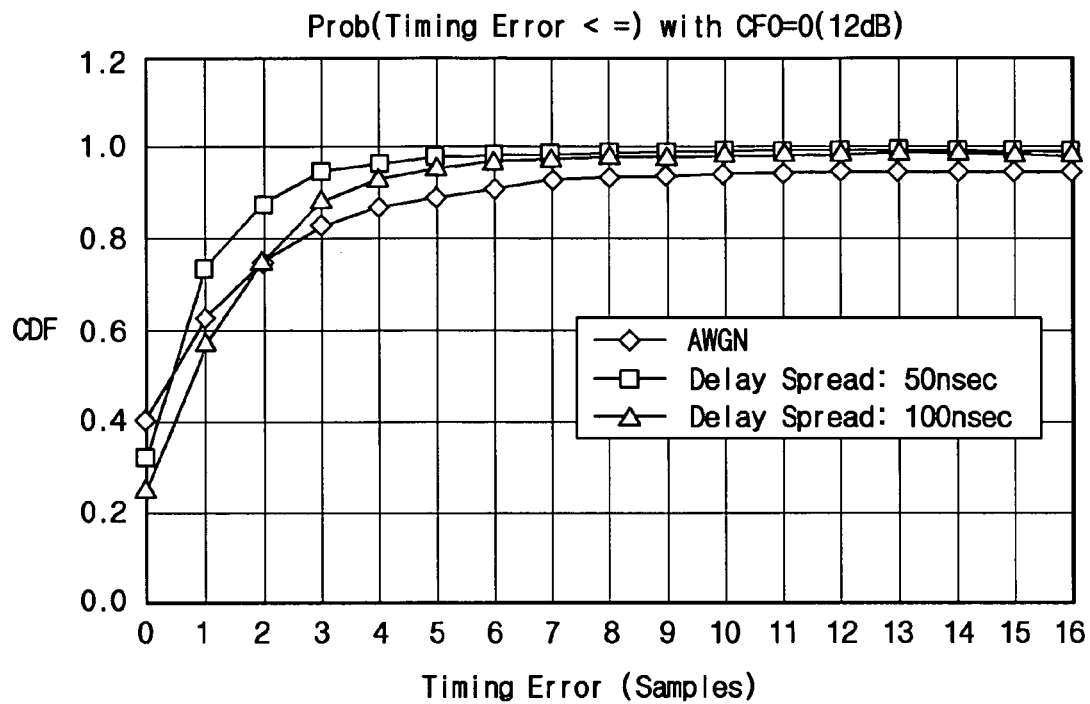
FIG. 8 shows the probability of causing an error in a white noise and delay spread channel environment in the apparatus of FIG. 6.

FIG. 7 shows the output of a symbol timing detector in a white noise and delay spread channel environment in the apparatus of FIG. 6, and FIG. 8 shows the probability of causing an error in a white noise and delay spread channel environment in the apparatus of FIG. 6.

It is revealed in FIGS. 7 and 8 that the second embodiment reduces the complexity relative to the first embodiment according to the structure of FIG. 3, but has a 4 to 5% probability of the occurrence of an error in a white noise and delay spread channel environment in the apparatus of FIG. 6.

To solve the problem with the second embodiment, an apparatus for symbol timing detection according to a third embodiment is constructed as follows.

Figure 9:
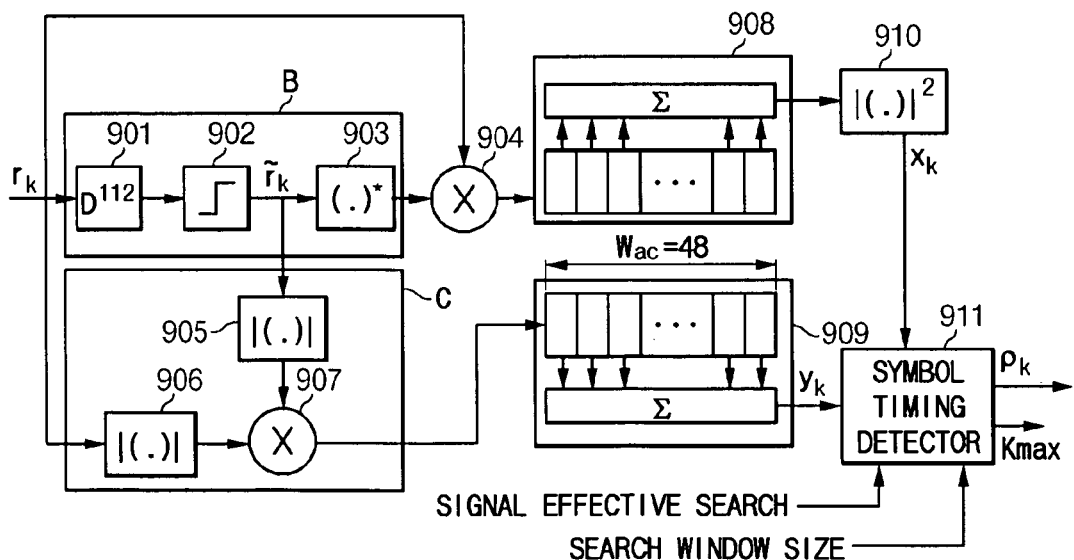
FIG. 9 is a block diagram of an apparatus for symbol timing detection for a wireless communication system according to a third embodiment of the present invention.

FIG. 9 is a block diagram of an apparatus for symbol timing detection for a wireless communication system according to a third embodiment of the present invention.

Referring to FIG. 9, the apparatus for symbol timing detection according to the third embodiment, which is a modified structure of the apparatus for symbol timing detection according to the second embodiment as shown in FIG. 6, comprises an autocorrelation delay section 901, a mapper 902, a complex conjugate processor 903, multipliers 904 and 907, absolute value calculators 905 and 906, moving average calculators 908 and 909, an absolute value calculator 910, and a symbol timing detector 911.

The autocorrelation delay section 901, the mapper 902, and the complex conjugate calculator 903 have the same functions as described in the first embodiment and belong to an autocorrelation delay processor B for autocorrelation-delaying of the received signal, one-bit mapping, and then complex-conjugate processing.

The absolute value calculator 905 calculates the absolute value of the mapped signals from the autocorrelation delay section 901 and the mapper 902, and the absolute value calculator 906 calculates the absolute value of the received signal. The multiplier 907 multiplies the output signal of the absolute value calculator 905 by the output signal of the absolute value calculator 906.

The moving average calculators 908 and 909 and the absolute value calculator 910 have the same functions as described in the first embodiment. The symbol timing detector 911 extracts the maximum and its position using the output signals $x_k$ and $y_k$ of the absolution calculator 910 and the moving average calculator 909, respectively, to determine the start of the user data.

In the third embodiment, $\Delta_{ac}=112$ and the value $r_k$ of the received signal itself is the quantized signal of the analog-to-digital converter.

The signal $\rho_k$ in the third embodiment is given by:

$$\rho_k = \left|\frac{x_k}{y_k}\right| = \frac{\left|\sum_{i=0}^{W_{ac}-1} r_{k-i} \tilde{r}^*_{k-\Delta_{ac}-i}\right|}{\sum_{i=0}^{W_{ac}-1} |r_{k-i}||\tilde{r}^*_{k-i}|} = \frac{\left|\sum_{i=0}^{47} r_{k-i} \tilde{r}^*_{k-112-i}\right|}{\sum_{i=0}^{47} |r_{k-i}||\tilde{r}^*_{k-i}|} \quad \text{Equation 5}$$

The use of the apparatus for symbol timing detection having the structure of FIG. 9 enables signal processing irrespective of the variations of the signal level caused by automatic gain control. In addition, the output of the analog-to-digital converter is used for the detection of the signals after the automatic gain control, i.e., the signals of the last third or fourth period, thus enhancing the performance of the detection apparatus.

The calculation method of correlation coefficients is varied as can be seen from the Equation 4, in which $\tilde{r}_k^*$ is the conjugate complex number obtained by delaying $r_k$ by $\Delta_{ac}$ and mapping it to a one-bit signal.

The experimental results of the apparatus for symbol timing detection according to the third embodiment of the present invention are as follows.

Figure 10:
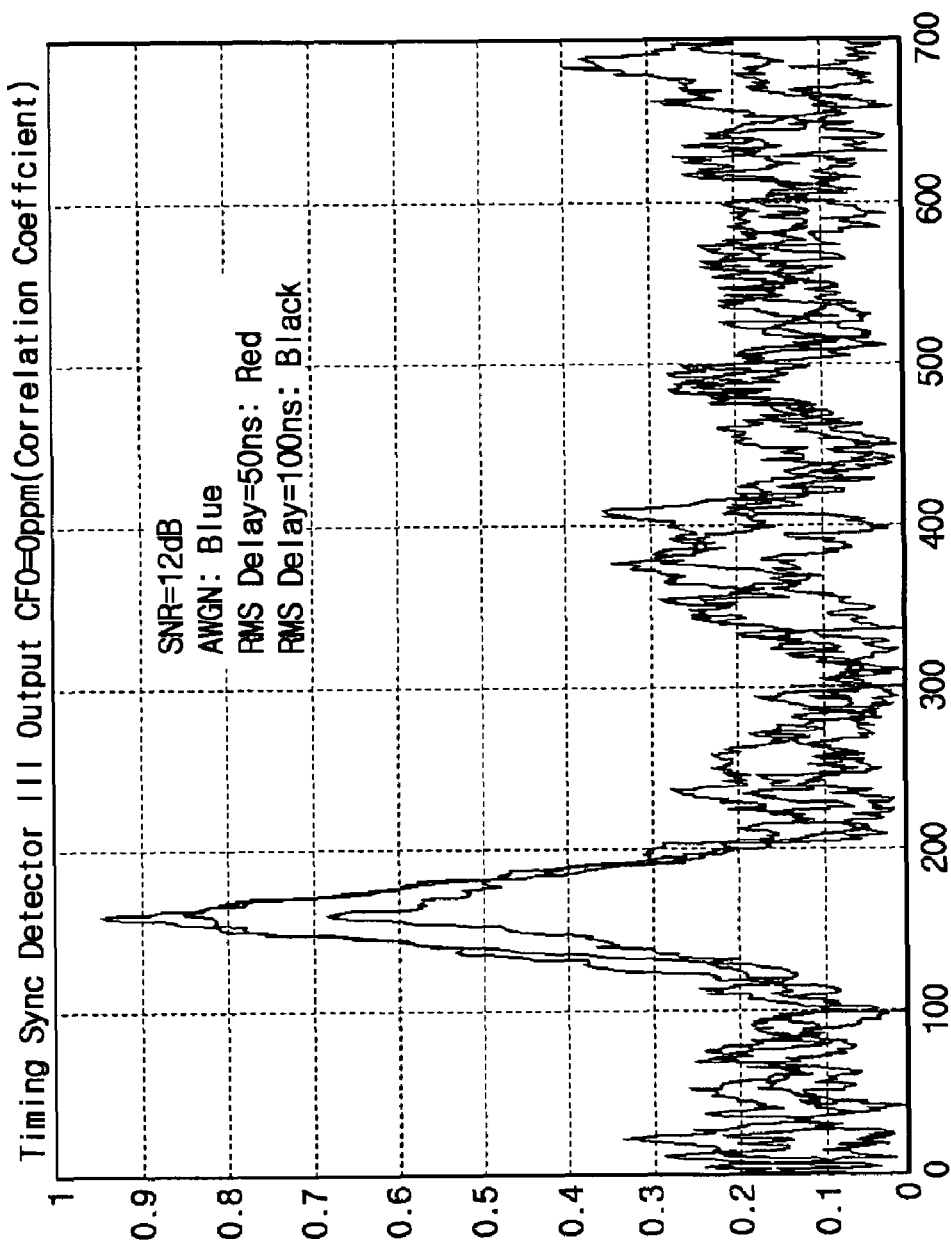
FIG. 10 shows the output of a symbol timing detector in a white noise and delay spread channel environment in the apparatus of FIG. 9.
Figure 11:
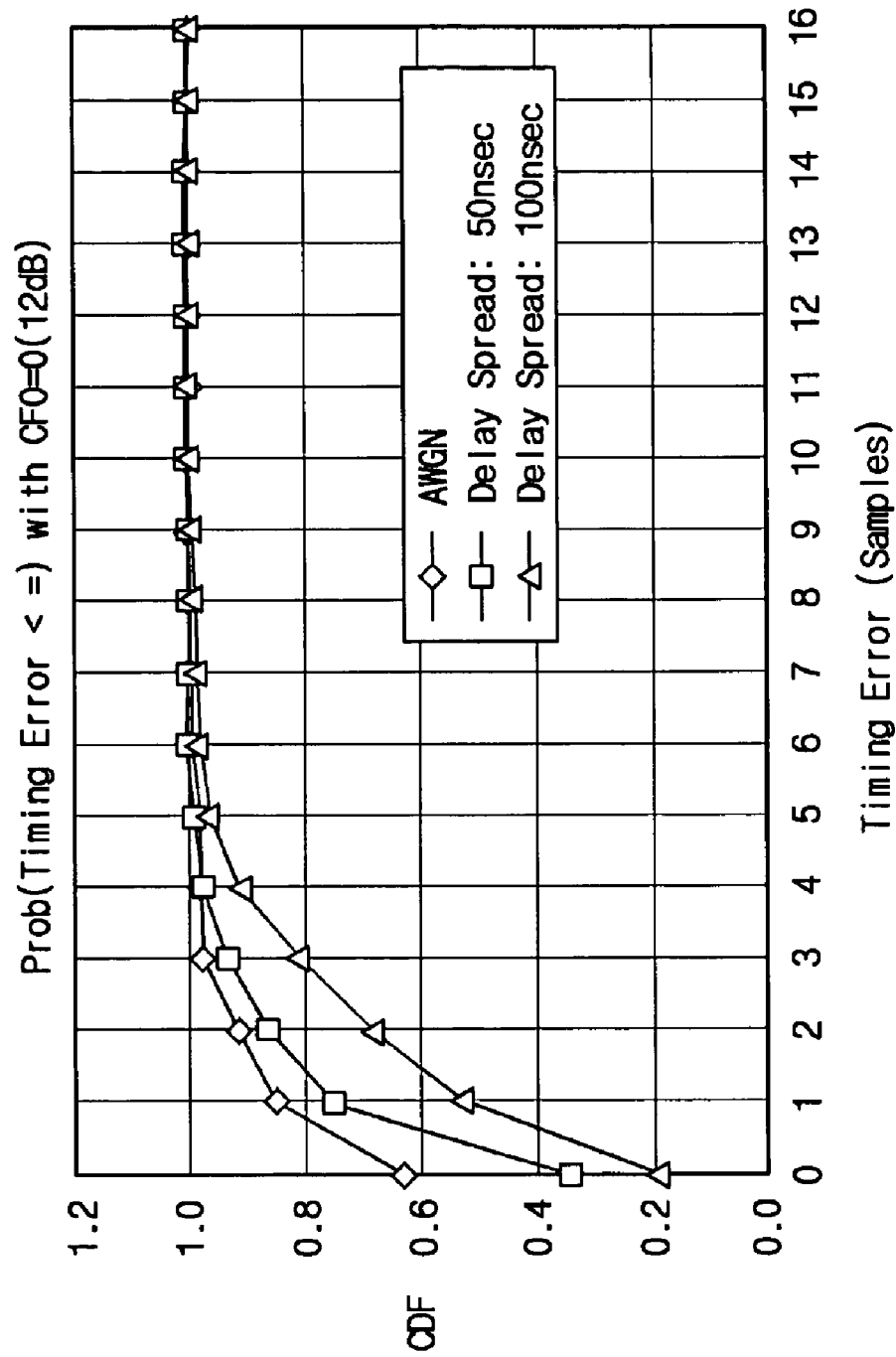
FIG. 11 shows the probability of causing an error in a white noise and delay spread channel environment in the apparatus of FIG. 9.

FIG. 10 shows the output value of a symbol timing detector in a white noise and delay spread channel environment in the apparatus of FIG. 9, and FIG. 11 shows the probability of causing an error in a white noise and delay spread channel environment in the apparatus of FIG. 9.

Referring to FIGS. 10 and 11, the detection apparatus, which solves the problems with the second embodiment, has an almost zero probability of timing error being more than 16 samples at a low SNR, and a more than 90% probability of symbol timing error being less than 4 samples.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

As described above, the apparatus for symbol timing detection for a wireless communication system according to the present invention makes use of samples of the output of an analog-to-digital converter prior to the completion of the automatic gain control function to detect symbol timing using the autocorrelations of the samples, provides a structure supporting an average window size and a delay value to optimize the complexity of the structure, and allows demodulation of signals with high reliability.

Furthermore, because the present invention increases the capacity of the communication system and optimizes the complexity of the structure, production cost and power consumption are reduced.

What is claimed is:

1. An apparatus for symbol timing detection for a wireless communication system, for detecting a start of user data of a packet having a cyclically repeating preamble in the wireless communication system, the apparatus comprising:
a mapper for mapping a received packet signal with a predetermined number of bits;
an autocorrelation delay processor for delaying the mapped signal of the mapper by a correlation delay sample according to an autocorrelation of the received signal, and converting the delayed signal to a complex conjugate signal;
a multiplier for multiplying the signal, delayed by the correlation delay sample and converted to a complex conjugate signal from the autocorrelation delay processor, by the mapped signal of the mapper;
a first moving average calculator for storing an output signal of the multiplier in a shift register having a predetermined window size, and calculating an average of a shifted value according to signal reception to output a moving average;
a squarer for making the second power of the mapped signal of the mapper;
a second moving average calculator for storing an output signal of the squarer in a shift register having a window size equal to the moving average, and calculating an average of a shifted value according to signal reception to output a second moving average; and
a symbol timing detector for extracting the start of the user data using an absolute value of an output signal of the first moving average calculator and an output signal of the second moving average calculator.

2. The apparatus as claimed in claim 1, wherein the autocorrelation delay processor comprises:
an autocorrelation delay section for delaying the mapped signal of the mapper by a magnitude of the autocorrelation delay sample; and
a complex conjugate processor for converting the delayed signal of the autocorrelation delay section to a complex conjugate signal.

3. The apparatus as claimed in claim 1, wherein an output signal $\rho_k$ of the symbol timing detector for symbol timing extraction is given by:

$$\rho_k = \left|\frac{x_k}{y_k}\right| = \frac{\left|\sum_{i=0}^{W_{ac}-1} r'_{k-i} \tilde{r}^*_{k-\Delta_{ac}-i}\right|}{\sum_{i=0}^{W_{ac}-1} |r'_{k-i}|^2}$$

wherein $x_k$ is the absolute value of the output signal of the first moving average calculator; $y_k$ is the output signal of the second moving average calculator; $r'_k$ is a signal obtained by mapping the received packet signal $r_k$ of the wireless communication system with the mapper; and $r'_{k-\Delta_{ac}}{}^*$ is a conjugate complex number of a signal obtained by delaying the signal $r'_k$ by $\Delta_{ac}$.

4. The apparatus as claimed in claim 1, wherein the received packet signal is a signal obtained by digitizing the received analog signal of the wireless communication system before the automatic gain control.

5. The apparatus as claimed in claim 1, wherein the symbol timing detector recognizes the end of the preamble of the received signal according to the window sizes of the first and second moving average calculators and extracts the start of the user data.

6. An apparatus for symbol timing detection for a wireless communication system, for detecting a start of user data of a packet having a cyclic repeating preamble in the wireless communication system, the apparatus comprising:
an autocorrelation delay processor for delaying a received packet signal by a correlation delay sample according to autocorrelation, mapping the delayed signal with a predetermined number of bits, and converting the mapped signal to a complex conjugate signal;

a first multiplier for multiplying an output signal of the autocorrelation delay processor by the received signal;

a second multiplier for multiplying a signal obtained by quantizing the delayed and mapped signal of the autocorrelation delay processor by the received signal;

a first moving average calculator for storing an output signal of the first multiplier in a shift register having a predetermined window size, and calculating an average of the shifted value according to signal reception;

a squarer for making the second power of an output signal of the second multiplier;

a second moving average calculator for storing an output signal of the squarer in a shift register having a window size equal to the moving average, and calculating an average of the shifted value according to signal reception; and a symbol timing detector for detecting the start of the user data using an absolute value of an output signal of the first moving average calculator and an output signal of the second moving average calculator.

7. The apparatus as claimed in claim 4, wherein the autocorrelation delay processor comprises:

an autocorrelation delay section for delaying the mapped signal of the mapper according to a defined magnitude of an autocorrelation delay sample;

a mapper for mapping the delayed signal of the autocorrelation delay section with a predetermined number of bits; and a complex conjugate processor for converting an output signal of the mapper to a complex conjugate signal.

8. The apparatus as claimed in claim 4, further comprising an absolute value processor for calculating an absolute value of the mapped signal of the mapper and transmitting it to the second multiplier.

9. The apparatus as claimed in claim 4, wherein an output signal $\rho_k$ of the symbol timing detector for symbol timing extraction is given by:

$$\rho_k = \left|\frac{x_k}{y_k}\right| = \frac{\left|\sum_{i=0}^{W_{ac}-1} r_{k-i} \tilde{r}^*_{k-\Delta_{ac}-i}\right|}{\sum_{i=0}^{W_{ac}-1} |r_{k-i}||\tilde{r}^*_{k-i}|}$$

wherein $x_k$ is the second power of the output signal of the first moving average calculator; $y_k$ is the output signal of the second moving average calculator; $\tilde{r}^k$ is the signal obtained by delaying the received packet signal $r_k$ of the wireless communication system by the correlation delay and mapping it with a predetermined number of bits; and $\tilde{r}_{k-\Delta_{ac}}$ is a conjugate complex number of a signal obtained by delaying the signal $\tilde{r}_k$ by $\Delta_{ac}$.

* * * * *